United States Patent [19]
Shephard et al.

[11] 3,880,463
[45] Apr. 29, 1975

[54] SEAT WITH BACK SUPPORT

[75] Inventors: Bernard William Shephard, Basildon; Kenneth George Draper, Burnham-on-Crouch, both of England

[73] Assignee: Ipeco Europe Limited, Southend-on-Sea, Essex, England

[22] Filed: Jan. 31, 1973

[21] Appl. No.: 328,385

[30] Foreign Application Priority Data
Feb. 2, 1972 United Kingdom............... 4820/72

[52] U.S. Cl................................ 297/284; 297/361
[51] Int. Cl.................................... A47c 1/031
[58] Field of Search........... 297/284, 353, 354, 361, 297/362

[56] References Cited
UNITED STATES PATENTS

| | | | |
|---|---|---|---|
| 378,433 | 2/1888 | Cooper | 297/353 X |
| 567,096 | 9/1896 | Harvey | 297/284 X |
| 2,139,028 | 12/1938 | Mensendieck | 297/284 |
| 2,550,831 | 5/1951 | Lingenfelter | 297/284 |
| 2,619,157 | 11/1952 | Guyton | 297/284 |
| 2,756,809 | 7/1956 | Endresen | 297/284 |
| 2,991,124 | 7/1961 | Schwarz | 297/284 |
| 3,730,589 | 5/1973 | Lane | 297/284 |

*Primary Examiner*—Francis K. Zugel
*Attorney, Agent, or Firm*—Lockwood, Dewey, Zickert & Alex

[57] ABSTRACT

In the embodiment shown, a seat has a lumbar support which is adjustable both as to its height above a seat portion (which bears the weight of a person on the seat) and as to the extent to which it can project forwardly to provide support behind the lumbar region of the user. The whole of the seat back on which it is borne is pivotally adjustable as to angle of recline, independently. Controls for the adjustment of the lumbar support are accessible to the user as he sits in the chair and are disposed coaxially with the pivot axis of the seat back. There is a separate shoulder support borne on a common frame with the lumbar support for movement with it. Adjustable and vertically and laterally retractable arm rests are also shown.

9 Claims, 6 Drawing Figures

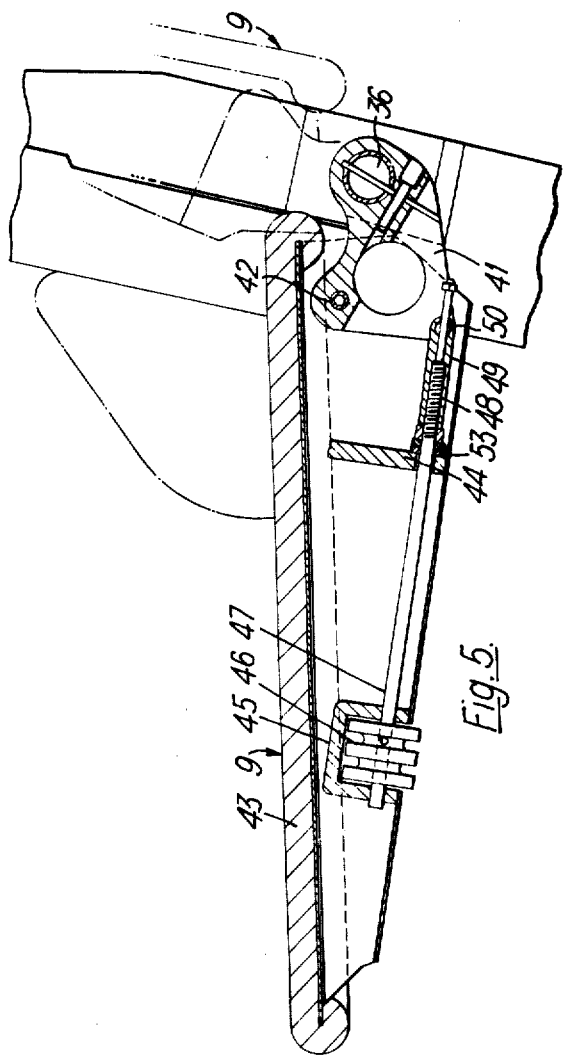

3,880,463

SEAT WITH BACK SUPPORT

FIELD OF THE INVENTION

This invention relates to seats, and particularly to seats for vehicles. We are concerned with seats for the driver or crew of a vehicle and especially (because of the specific and highly demanding conditions in that use) with seats for aircrew.

It is a prime consideration in the construction of these seats that the person, particularly an aircrew member, using them shall have his back correctly and comfortably supported, particularly in the lumbar region and at his shoulders by a back rest forming part of or mounted on the seat back.

BACKGROUND OF THE INVENTION

Attempts have been made to provide an adjustable seat back, particularly by the commonly known "reclining" seat, where the whole of the seat back is adjustable as to the angle it makes to the seat portion on which the user sits. This solution is not satisfactory where the user, such as a driver or pilot, has to maintain a substantially constant spacing between his shoulders and controls which he is operating with his hands. There has been suggested in United Kingdom pat. specification No. 1,199,756 a lumbar support on a fixed back. This support is however only movable in one direction — it is only adjustable as to the amount that it projects forwardly to bear against the lumbar region of the user. Its height is not adjustable and so the fullest range of variation is not available to the user: it suggests nothing about how variation in height and projection may independently be provided. Nor does this prior proposal deal with the problem of the combination of the means needed for such adjustments with the mechanism of a reclining or adjustable seat back, which is dealt with in preferred embodiments, at least, of the present invention.

SUMMARY OF THE INVENTION

It is an object of the invention to provide a seat which allows independent adjustment of distance which the lumbar support projects from the seat back and of the distance at which it is spaced from a seat portion of the seat, without the person having to move from his operational attitude. By "seat portion" we mean in this specification the generally horizontal element on which the person is to sit and which will support him vertically.

According to the invention we provide a vehicle seat which has a seat portion and a seat back, and a back rest movably mounted on the seat back for supporting at least the lumbar region of a person sitting on the seat portion, which back rest is adjustable as to its distance from the seat portion and, in any position of the said adjustment, as to the distance which the lumbar supports projects from the seat back, independent controls for the respective adjustments being both accessible to a person while seated on the seat portion in an operational attitude. In a preferred form of the invention the seat back is an adjustably reclining seat back movable relative to the seat portion about a pivot axis, and the controls are both brought in co-axially with the pivot axis of the seat back.

It is further desirable that if arm rests are provided on the seat they shall be retractable so as to allow free movement for the person to slide into his seat but that when in the lowered position, in which they can support the weight of the person's arms, they shall be adjustable as to angle in a vertical plane. To this end, arm rests may be provided in a seat as defined above which are mounted on respective arm rest pivot shafts of which the axis of rotation extends laterally of the seat so that the arm rests may be moved from a generally horizontal, arm-supporting condition to a generally vertical retracted condition, the arm supporting part of the rests being themselves pivotally supported relative to the respective arm rest pivot shaft and having a control whereby its angular relationship to the said shaft may be controlledly adjusted, the said shafts being, at least in the vertical condition of the arm rests, slidable laterally inwardly of the seat back of the seat.

A particular embodiment of the invention as an aircrew seat will now be described with reference to the accompanying drawings wherein:

FIG. 5 shows an arm rest in elevation and section.

Figure 1:
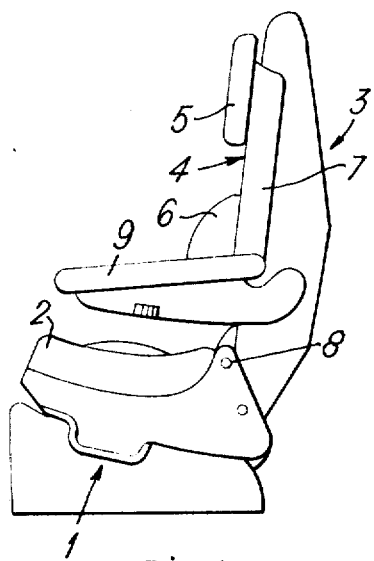
FIG. 1 is a diagrammatic side elevation of a seat embodying the invention.

An aircrew seat 1 has a generally horizontal seat portion 2 upon which the crew member is to sit and be vertically supported. The seat has a seat back 3 upon which is supported a back rest 4 which as shown has separate upholstered parts 5 and 6 for supporting the shoulders and lumbar region respectively of an aircrew member on the seat. The upholstered portions 5 and 6 are supported in the upper and lower ends of a frame 7 movably mounted on the seat back 3. Although economy of upholstery is preferred for lightness, a single upholstered part may extend over the back rest to support the whole of the back of the aircrew member.

The seat back 3 is pivoted as a whole about the axis of a shaft 8 so that it may be adjusted as a whole to allow reclining or semi-reclining positions to be adopted.

Also on the seat back 3 are supported arm rests 9 which are adjustable as to angle relative to the back 3 when in their lower, arm-supporting, position and are also movable bodily to retracted position.

These actions will now be described in more detail with reference to the remaining figures.

Figure 4:
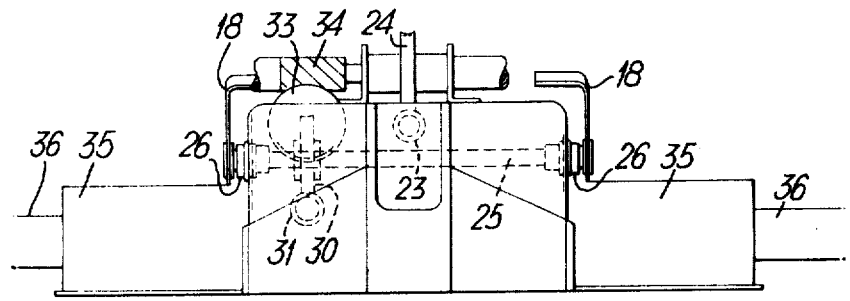
FIG. 4 is a view of the back rest from above.
Figure 2:
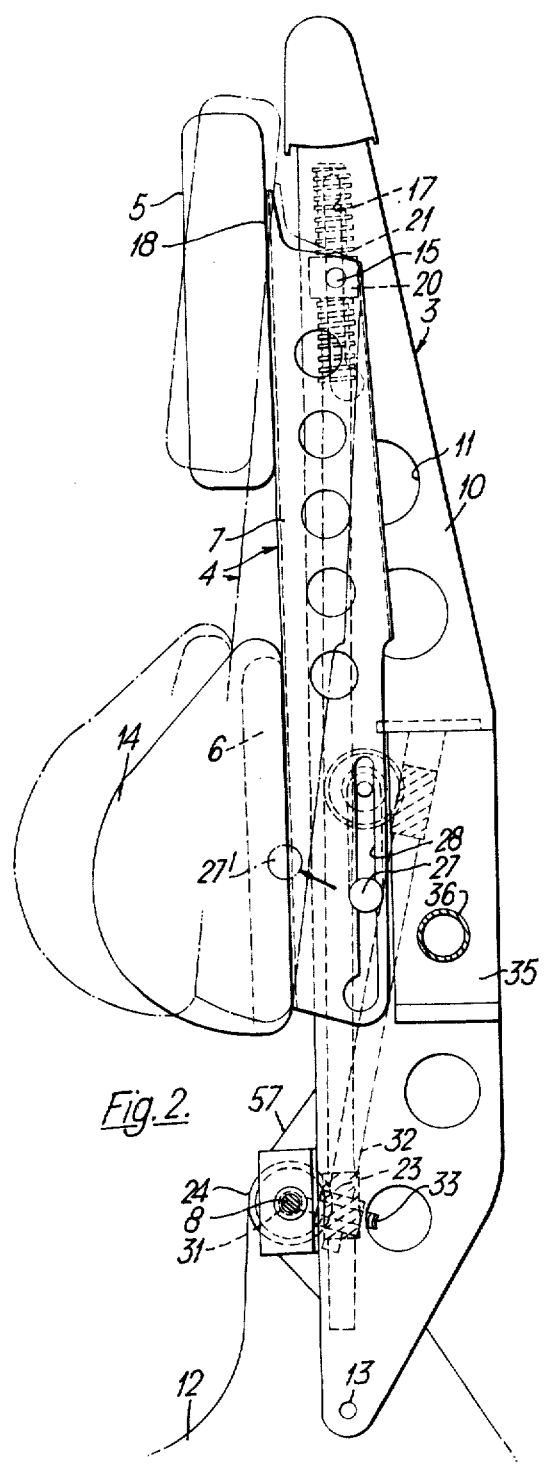
FIG. 2 is a side elevation of the back structure of the seat and showing a back rest.
Figure 3:
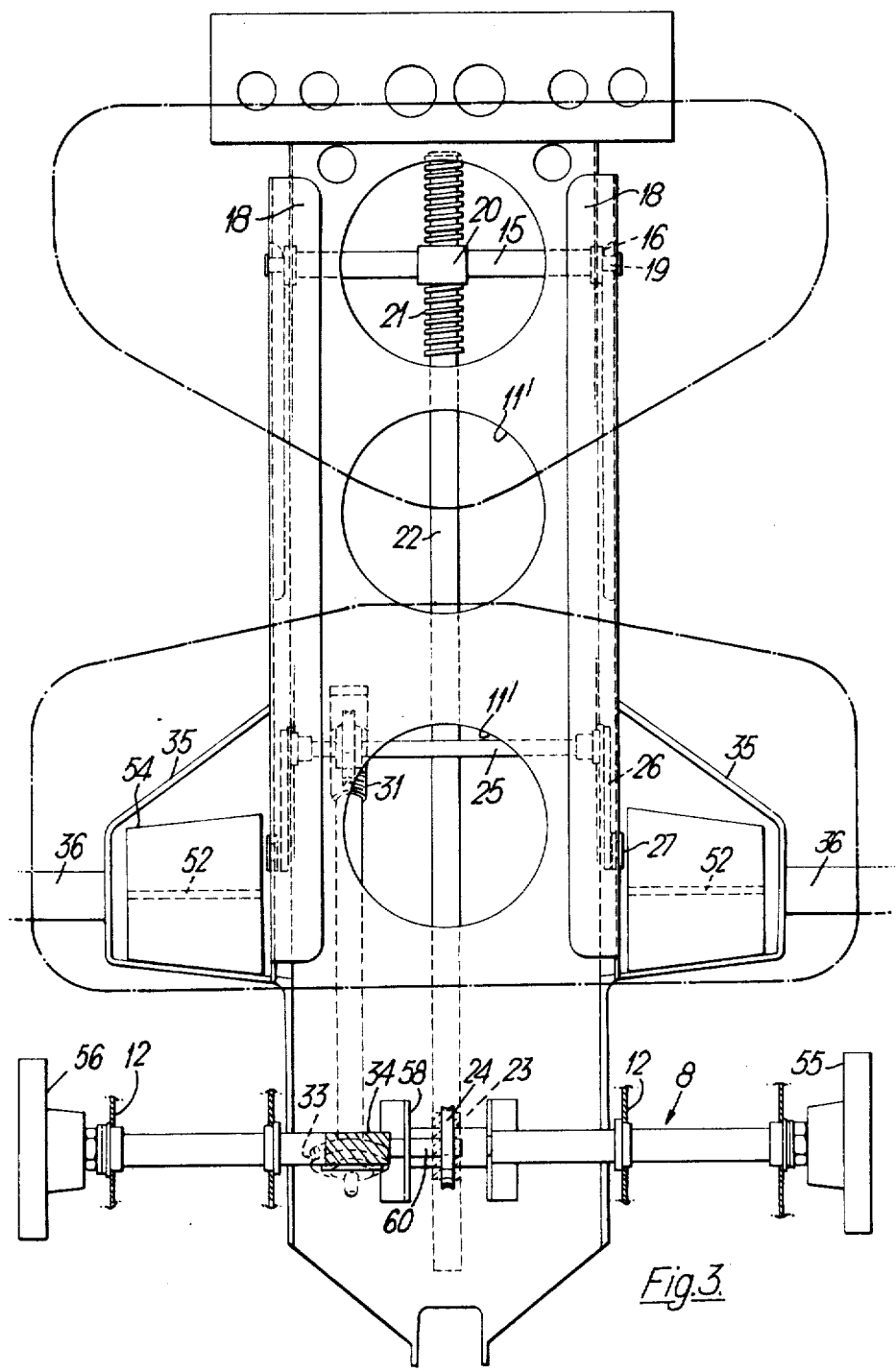
FIG. 3 is a view of the back rest from the back, shown without the arm rest.

FIGS. 2, 3 and 4 are concerned with the structure of the back rest and its adjustable mounting on the seat back.

The seat back in FIGS. 2 and 3 is of a hollow box structure having its side plates 10 and its front and rear plates relieved with holes such as 11 for lightness. The box structure is preferably made by a dip-braze process which allows ease of manufacture and lightness combined with great rigidity and strength.

The seat back 3 as a whole is pivoted on the axis of a composite hollow shaft 8 borne in a frame 12 of the seat portion. It may be attached at its base 13 to means controlling the angle of the seat back as a whole relative to the seat portion so that the seat back is in reclining or semi-reclining position, and these control means may be conventional. Of course, the invention is also applicable to seats in which the seat back is fixed.

The seat back bears upon it a back rest structure 4 borne on its frame 7 and consists of separate upholstered pads 5 and 6, the latter which is for the lumbar region having forwardly extending wings 14.

The frame 7 is pivoted on a shaft 15 of which the outer end portions are fitted with rollers 16 which run in elongate slots 17 in the side members 10. Beyond those rollers is a part 19 of the shaft 15 of reduced diameter on which are pivoted angle members 18 which are the main longitudinal structural parts of the frame 7.

The position of the shaft 15 along the slot 17 governs the vertical position of the back rest 4 relative to the seat portion 2. This is controlled by interposing in the shaft 15 a screw-threaded boss 20 engaging a screw-threaded end 21 of a rotatable rod 22 which at its lower end has a driven worm engaged and rotated by a driving pinion 24 which is itself rotated in a manner which will be described.

It can be seen that by rotation of the rod 22 the boss 20 is moved up and down, and the shaft 15 extending from it imposes movement on the frame 7 within the limit of the slot 17, to alter the distance the back rest is, as a whole, from the seat portion.

The back rest 4 can also be adjusted in its angle relative to the seat back. This is achieved by providing a transverse shaft 25 which has at each of its ends a lever arm 26 and each of these has at its free end a stud 27 which engages in a longitudinal slot 28 in the angle members 18 of the frame 7 of the back rest 4. To drive the shaft 25 in rotation, a pinion 30 is fast with the shaft and is engaged by a worm 31 on a rod 32 which is rotated at its other end by a pinion 33 driven by a worm 34 coaxial with but independent from the wheel 24.

To adjust the angle of the back rest, the rod 32 is rotated by the worm 34 which causes rotation of the lever arms 26 so that the stud 27 moves for example to the position 27' (FIG. 2) to cause the back rest to adopt the angular position indicated in dot-dash lines in FIG. 2. Since the stud 27 runs in the longitudinal slot 28 this angular adjustment may be effected whatever the position of the shaft 15 in the slot 17, i.e., whatever the distance between the back rest as a whole and the seat portion.

Figure 6:
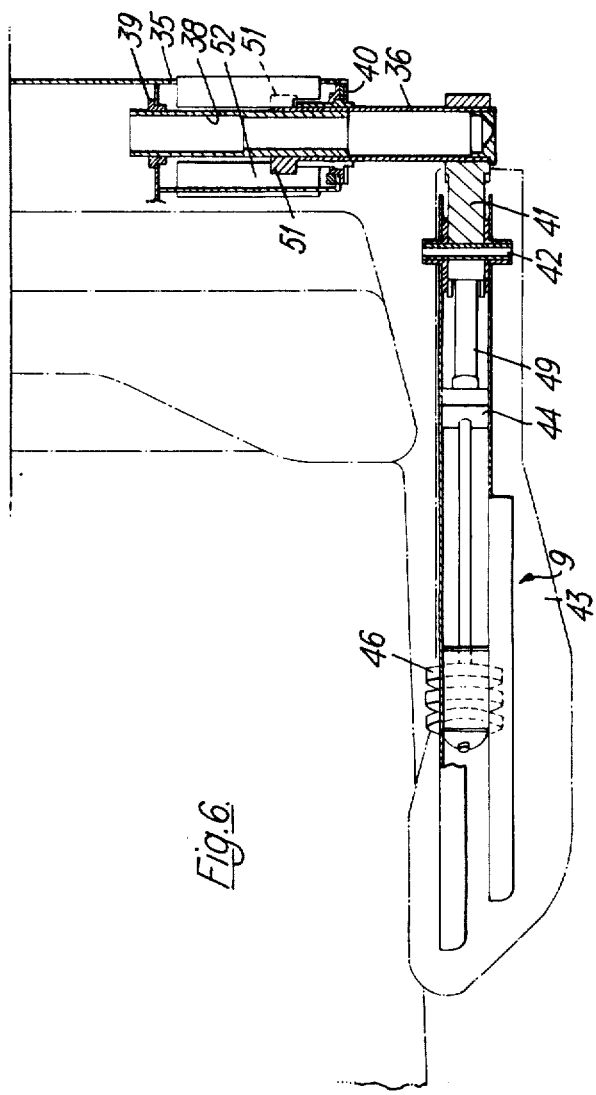
FIG. 6 shows the same in plan and section.

The back rest has outside its side members 10 box constructions 35 which offer journals to hollow shafts 36 on which the arm rests 9 are pivoted as a whole relative to the seat back 3. This construction will now be described in more detail with reference to FIGS. 5 and 6.

The shaft 36 consists of two sleeves 37 and 38 the latter fitting within the end of and prolonging the other. Sleeve 38 is journalled in a laterally inner part of the box 35 as at 39 and the sleeve 37 in a laterally outer part at 40. The shaft 36 as a whole is movable along its axis in these journals and is also rotatable within them. To the laterally outer end of the shaft is clamped a generally triangular made up boss 41 upon which the arm supporting part of the arm rest 9 is pivoted at 42.

The arm supporting part consists of a top layer of upholstery 43 borne on a hollow frame which is generally triangular when seen in elevation and which includes a bulkhead wall 44 and a cage 45 for an adjustment knob 46. The adjustment knob 46 is mounted for rotation by a rod 47 which extends from the cage 45 to the bulkhead 44 and through an aperture in the latter to engage by means of a screw-threaded end 48 in a screw-threaded blind sleeve 49 which is pivoted to the boss 41 at 50. The control wheel 46 has a knurled exposed surface and is keyed to the rod 47 so that rotation of the wheel causes the sleeve 49 to be drawn towards or pushed away from the wall 44, this causing pivotal motion of the arm supporting part of the arm rest relative to the boss 41 and hence relative to the shaft 36, about the pivot axis 42, through a collar 53 pinned to the shaft 47 and bearing on the wall 44. In FIG. 5 the arm supporting part of the arm rest is shown in its lowermost adjustment position, in which the sleeve 49 is drawn up against the collar 53 which is also in contact with the wall 44.

The arm rest is however as a whole pivotable on the axis of the shaft 36 so that it can be brought to a retracted position in which it lies generally parallel to the seat back 3 and which is shown in dotted lines in FIG. 5.

The lowermost position of the boss 41 which is shown in FIG. 5 in full lines is defined by a pair of diametrically opposed projecting ears 51 which are integrally machined at the laterally inner end of the sleeve 37. Alternatively the shaft 36 may be one-piece, with ears 51 machined in it. One face of each ears engages with inwardly projecting ribs 52 on a plate 54 secured to the rear and front faces of the box 35 and act as a stop for further anti-clockwise rotation of the shaft 36.

The uppermost retracted, position of the lug 41 is defined by abutment of the other face of the ears 51 against the plates 52.

In its uppermost position the arm may also be axially retracted by sliding the shaft 36 laterally inwardly.

Control of the height and angular position of the back rest 4 is achieved independently by control knobs 55 to control the height, and 56 to control the angle. These are provided on the right and left hand sides of the chair on the ends of the composite shaft 8. The shaft 8 has two independent portions journalled respectively in the seat portion frame 12 in the side members of that frame as illustrated in FIG. 3 and in the seat back by extensions 57 of the side members 10 and also by angle trunnions 58 towards the centre line of the seat back 3. One portion is rigid from the knob 55 to the wheel 24 and the other portion is rigid from the worm 34 to the knob 56, the latter portion being centred by a spigot 60 in a recess in the end of the former portion. Thus it can be seen that the controls for independent height and angular adjustment of the back rest are both brought in co-axially of the axis of pivot for reclining action of the seat back as a whole, and are therefore in constant position relative to the seat portion, and the setting of the back rest relative to the seat back is varied either immaterially or not at all by alterations in the reclining angle of the seat back 3. Most importantly, and this would apply whether or not the seat back was adjustable in its reclining, both controls are available simultaneously to a crew member while he is sitting in the seat in an operational attitude. He may therefore try the effects of adjustment under the conditions for which he needs that adjustment.

Although this embodiment has been a seat for an aircrew member such as a pilot, it will be apparent that the invention may be applied to a seat for any intended use — even though the sophistication of the adjustment available would at present usually only be needed in the context of aircrew seats or those for long-distance heavy commercial road vehicles.

We claim:

1. A vehicle seat which has a seat portion and a seat back, the seat back including a seat back frame and a back rest, the back rest being borne on a back rest frame, the back rest including: supports respectively for the lumbar and shoulder regions of a person seated on the seat portion, the supports being both mounted on the back rest frame, the seat back frame having an elongate guide means, the back rest frame having a pivot, the pivot engaged in the elongate guide means, the pivot being movable in rotation about its axis and being movable in translation along the elongate guide means, separate adjustment means respectively determining the relative angular position of the frames about the axis of the pivot and the position of the pivot along the elongate guide, and independently operable controls respectively for the separate adjustment means being both accessible to a person while seated on the seat portion in an operational attitude.

2. A seat according to claim 1 wherein the means for determining the relative angular position of the frames is a lever arm mounted for rotation about an axis fixed in relation to the seat back frame and slidably received by the back rest frame.

3. A seat according to claim 1 wherein the said controls are rotatable knobs arranged to rotate about a single axis and positioned one on each side of the seat.

4. A seat according to claim 3 wherein the seat back is movable relative to the seat portion about a pivot axis, and the controls are both brought in co-axially with the pivot axis of the seat back.

5. A vehicle seat having a seat portion and a seat back, the seat back including a rigid seat back frame and a rigid back rest frame, the back rest frame having a lower end and an upper end, means for pivotally mounting the seat back frame to the seat portion whereby said seat back frame may be angularly adjusted relative to the seat portion, a movable mounting at the upper end of the back rest frame, the movable mounting bearing the back rest frame in the seat back frame, the back rest frame bearing a support for at least the lumbar region of a person sitting on the seat portion, the movable mounting being adapted to permit continuous movement of the back rest frame relative to the seat back frame in directions towards and away from the pivotal mounting and to permit angular movement of the back rest frame such that the support on the rigid back frame is displaced towards and away from the seat back frame, control means separately driving the said movements being each brought out to a position at a lateral side of the chair accessible to a person while seated on the seat portion in an operational attitude.

6. A seat according to claim 5 wherein the back rest includes also a support for the shoulder region of a person sitting on the seat portion, the lumbar support and shoulder supports being mounted on the back rest frame for movement together.

7. A seat according to claim 6 wherein the lumbar support and shoulder support are separate upholstered pads mounted on the back rest frame.

8. A vehicle seat which has a seat portion and a seat back, the seat back having a seat back frame and a back rest frame, the seat back having supports respectively for the lumbar and shoulder regions of a person sitting on the seat portion, the said supports both being borne on the back rest frame, means for pivotally mounting the seat back frame to the seat portion whereby said seat back frame may be angularly adjusted relative to the seat portion, the back rest frame being pivotally engaged to the seat back frame by pivotal engagement between pivot means and an elongate guide member, means determining the position of the pivotal engagement of the back rest frame with the seat back frame along the elongate guide, means determining the angular relationship of the back rest frame with the seat back frame about the axis of the pivotal engagement, and respective and independent controls for driving the said determining means being each brought out to a lateral side of the chair to be accessible to a person while seated on the seat portion in an operational attitude.

9. A seat according to claim 8 wherein the said controls are rotatable knobs arranged to rotate about a single axis and positioned on each lateral side of the seat, and the controls are both brought in co-axially with an axis about which said seat back is pivotally mounted.

* * * * *